United States Patent
Wu et al.

(10) Patent No.: US 7,561,357 B2
(45) Date of Patent: Jul. 14, 2009

(54) DECODER WITH ENERGIZATION CONTROL CIRCUIT

(75) Inventors: Det Hau Wu, Singapore (SG); Edmun ChianSong Seng, Singapore (SG); Lin Nah Lim, Singapore (SG); UttHeng Kan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 565 days.

(21) Appl. No.: 11/201,991

(22) Filed: Aug. 11, 2005

(65) Prior Publication Data

US 2007/0035866 A1    Feb. 15, 2007

(51) Int. Cl.
G11B 5/02   (2006.01)
G11B 5/03   (2006.01)

(52) U.S. Cl. .......................................... 360/29; 360/66
(58) Field of Classification Search ........................ None
See application file for complete search history.

(56) References Cited

U.S. PATENT DOCUMENTS

| | | | | |
|---|---|---|---|---|
| 5,283,531 A * | 2/1994 | Serizawa et al. | ............. | 329/316 |
| 5,422,760 A * | 6/1995 | Abbott et al. | ................. | 360/46 |
| 5,606,464 A * | 2/1997 | Agazzi et al. | ................. | 360/46 |
| 5,777,914 A * | 7/1998 | Larsson et al. | ............... | 708/322 |
| 6,043,946 A * | 3/2000 | Genheimer et al. | ........... | 360/53 |
| 6,282,661 B1 * | 8/2001 | Nicol | ......................... | 713/300 |
| 6,608,729 B1 | 8/2003 | Willems et al. | ................ | 360/69 |
| 6,633,894 B1 * | 10/2003 | Cole | .......................... | 708/300 |
| 6,813,661 B2 | 11/2004 | Li | ............................... | 710/62 |
| 6,850,577 B2 * | 2/2005 | Li | ............................... | 375/326 |
| 2001/0012171 A1 | 8/2001 | Lu et al. | .................. | 360/78.04 |
| 2001/0026516 A1 * | 10/2001 | Shoji et al. | ............... | 369/47.53 |
| 2001/0034850 A1 | 10/2001 | Atkinson | ..................... | 713/320 |
| 2002/0087225 A1 | 7/2002 | Howard | ........................ | 700/94 |
| 2002/0154712 A1 | 10/2002 | Cideciyan et al. | ........... | 375/341 |
| 2003/0202268 A1 | 10/2003 | Wang et al. | ................... | 360/31 |
| 2004/0165303 A1 | 8/2004 | Wu et al. | ...................... | 360/65 |
| 2004/0227488 A1 | 11/2004 | Odaohhara | ................... | 320/127 |
| 2004/0252395 A1 | 12/2004 | Elliott et al. | .................. | 360/51 |
| 2005/0002654 A1 | 1/2005 | Shiah et al. | .................. | 386/125 |
| 2005/0125704 A1 | 6/2005 | Brauer | ........................ | 713/320 |
| 2005/0144491 A1 | 6/2005 | Zayas | .......................... | 713/300 |

* cited by examiner

*Primary Examiner*—K. Wong
(74) *Attorney, Agent, or Firm*—Westman, Champlin & Kelly, P.A.

(57) ABSTRACT

A multistage decoder circuit has an error reduction stage that includes an adaptation circuit. The adaptation circuit provides adaptable error reduction as a function of bit error rate. The multistage decoder circuit has an energization control circuit that couples to the adaptation circuit. The energization control circuit controls an energization of the adaptation circuit as a function of actual or expected channel quality.

18 Claims, 5 Drawing Sheets

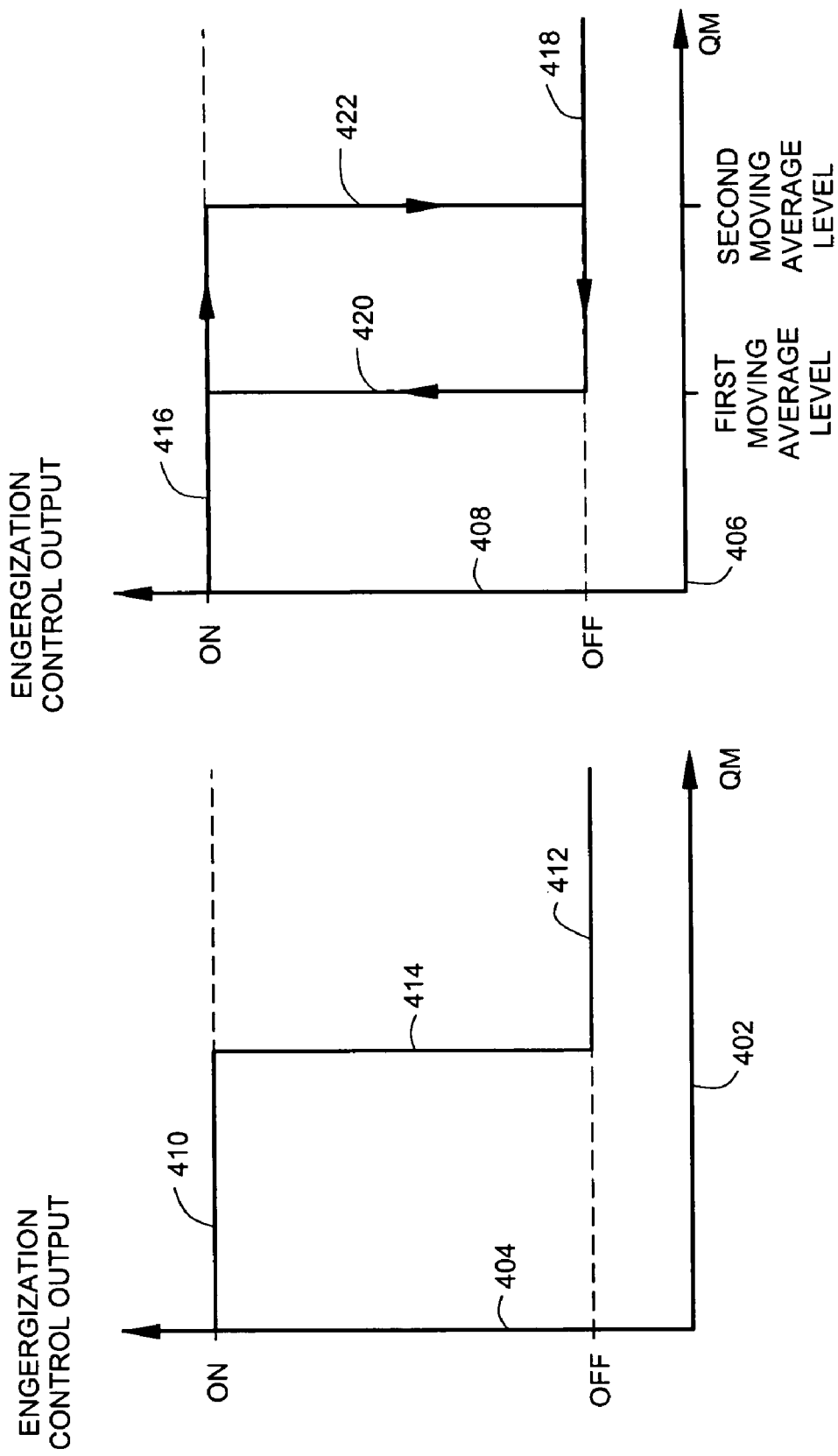

DECODER WITH ENERGIZATION CONTROL CIRCUIT

FIELD OF THE INVENTION

The present invention relates generally to control of energization in decoder circuits, and more particularly but not by limitation to control of energization supplied to adaptation circuits in battery powered devices.

BACKGROUND OF THE INVENTION

In portable electronic products, power consumption from a battery in the product is an important design consideration that impacts performance and consumer acceptance of the product. In portable handheld products that include disc drives, the disc motor and servo actuator in the disc drive consume a large part of the disc drive power budget. For a remaining part of the disc drive power budget, there is a desire to reduce power consumption from electronic circuitry in order to extend the service time of the handheld device between battery replacements and/or battery recharging.

Embodiments of the present invention provide solutions to these and other problems, and offer other advantages over the prior art.

SUMMARY OF THE INVENTION

A multistage decoder circuit is disclosed. The multistage decoder circuit comprises a first error reduction stage. The first error reduction stage includes an adaptation circuit. The adaptation circuit provides adaptable error reduction as a function of bit error rate.

The multistage decoder circuit comprises an energization control circuit. The energization control circuit couples to the adaptation circuit. The energization control circuit controls an energization of the adaptation circuit as a function of channel quality.

In one preferred embodiment, the function of channel quality comprises a count of a number of sectors read since a previous energization of the adaptation circuit. In another embodiment the first error reduction stage comprises an equalizing filter. In yet another embodiment, the multistage decoder circuit comprises a second error reduction stage that comprises a noise predictive maximum likelihood detector. The noise predictive maximum likelihood detector includes an adaptation circuit with energization controlled by the energization control circuit.

Other features and benefits that characterize embodiments of the present invention will be apparent upon reading the following detailed description and review of the associated drawings.

BRIEF DESCRIPTION OF THE DRAWINGS

FIGS. 4-5 show two examples of functioning of an energization control circuit.

DETAILED DESCRIPTION OF ILLUSTRATIVE EMBODIMENTS

In the decoder circuits described below, an energization control circuit controls energization of adaptation circuits in an adaptive equalizing filter and an adaptive noise predictive maximum likelihood (NPML) detector. When low error rates are present, and adaptation is not needed, the energization control circuit turns OFF adaptation circuits in the equalizing filter and in the NPML detector, conserving power while the equalizing filter and NPML continue to function with temporarily fixed tap settings. When high error rates are present, the adaptation circuits are turned on temporarily to recalibrate the equalizing filter and NPML detector for current conditions. No modification to adaptation circuits needs to be made other than a provision to shut off power to the adaptation circuits when they are not needed. The energization control circuit turns the adaptation circuits ON or OFF as a function of channel quality. The channel quality may be indicated by a number of sectors or zones that have been read since the last energization of the adaptation circuits or by sensing an indication of bit error rate or channel quality. Disc drive performance is not significantly degraded by the power conservation. Useful battery life is extended and user satisfaction with a portable device that includes the disc drive is improved.

Figure 1:
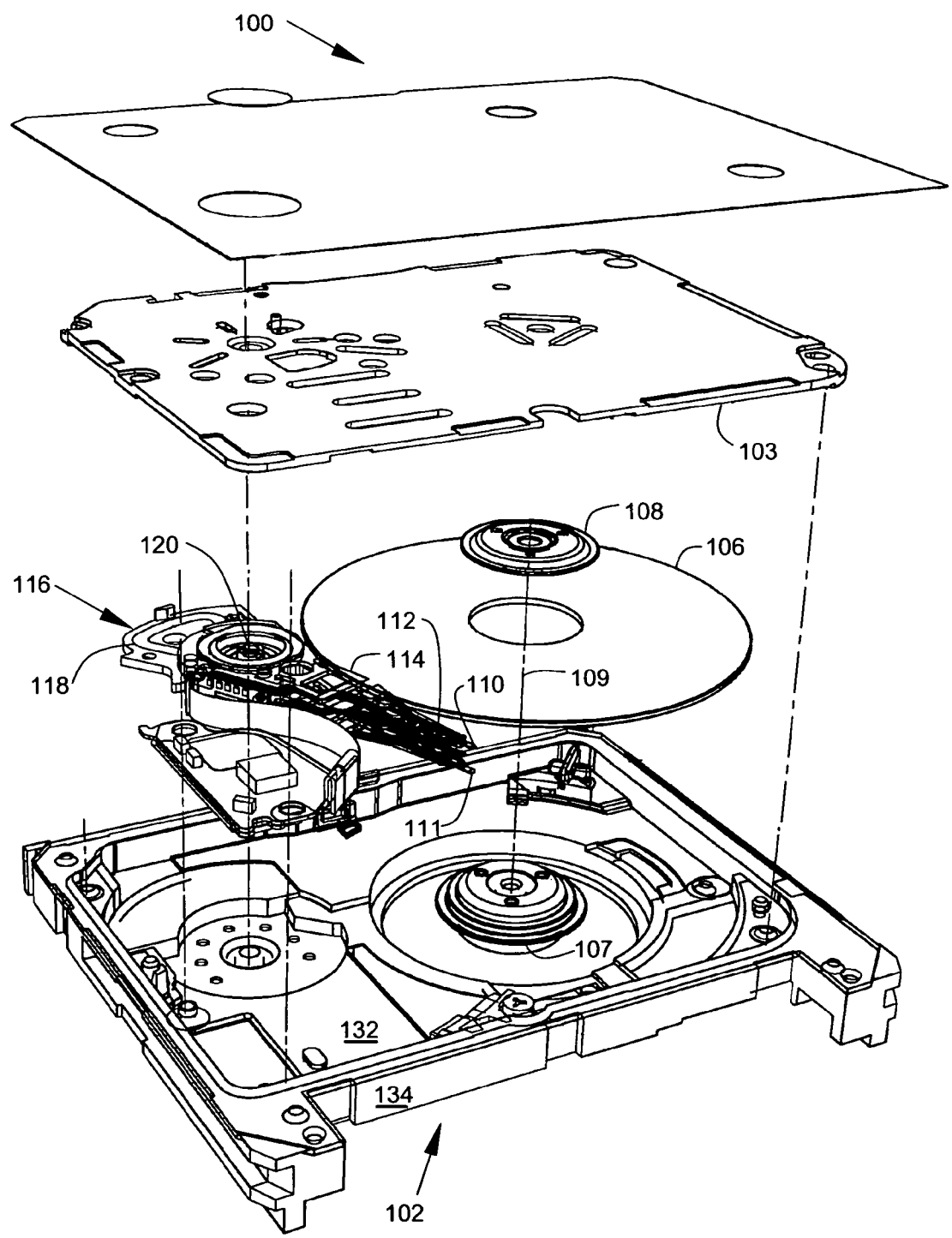
FIG. 1 is an isometric view of a disc drive.

FIG. 1 is an exploded view of a disc drive 100 in which embodiments of the present invention are useful. Disc drive 100 includes a housing with a base 102 and a top cover 103. The base 102 includes a central metal mounting plate 132 and a plastic rim 134 that is molded on the central metal plate 132. Disc drive 100 further includes a disc 106, which is mounted on a spindle motor 107 by a disc clamp 108. Disc 106 is mounted for rotation about a central axis 109. Each disc surface of disc 106 has an associated disc head slider 110, 111 which is mounted to disc drive 100 for communication with one of the disc surfaces. In the example shown in FIG. 1, sliders 110, 111 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110, 111 about a pivot shaft 120 to position heads 110, 111 over a desired data track along an arcuate path on the disc between a disc inner diameter and a disc outer diameter. In a preferred embodiment, the disc drive 100 comprises a 1 inch disc drive for use in battery powered portable consumer products.

Figure 2:
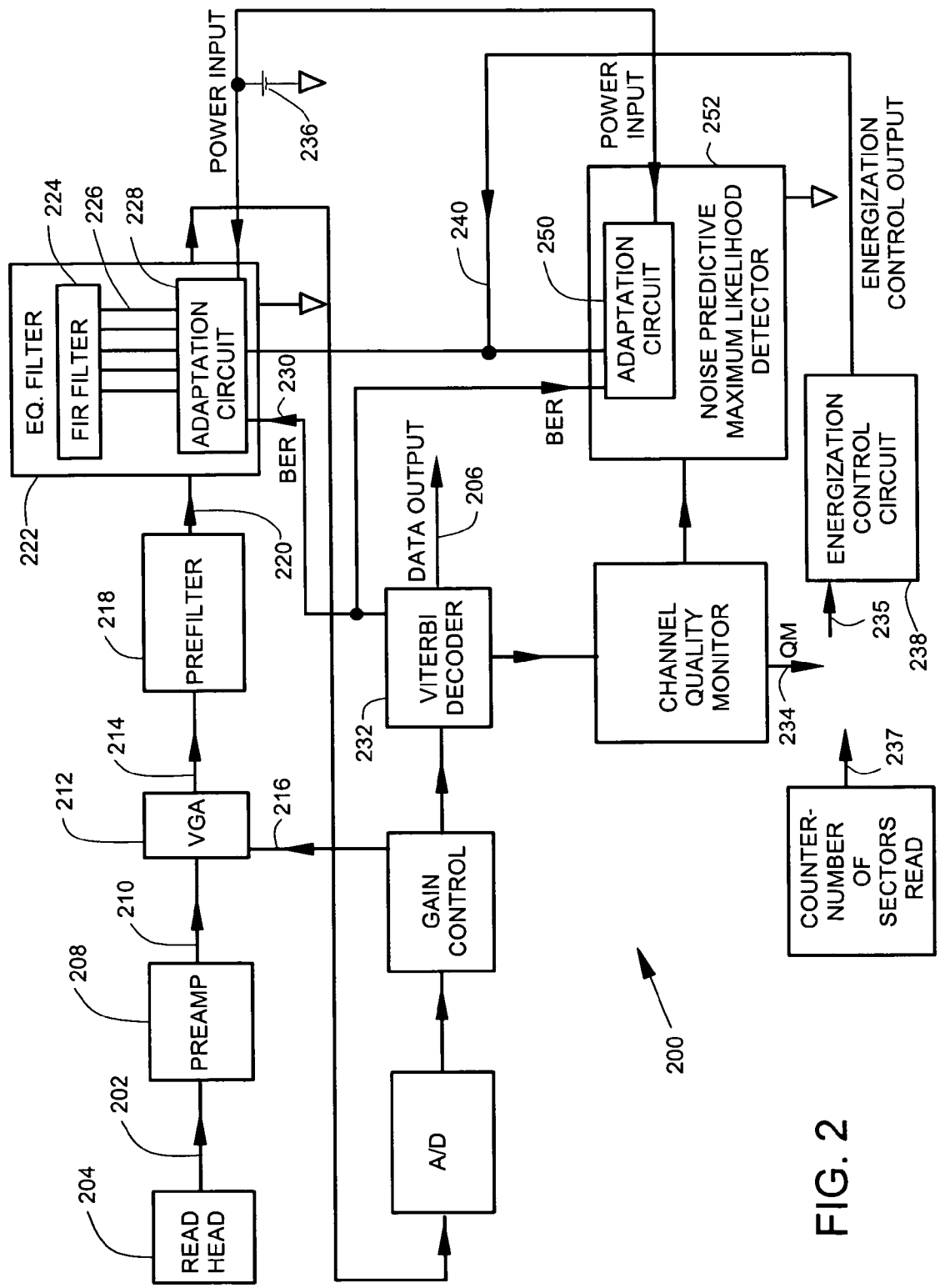
FIG. 2 illustrates a multistage decoder circuit in a read channel in a data storage device.

FIG. 2 illustrates a multistage decoder circuit 200 that is part of a read channel in a data storage device such as the disc drive 100 illustrated in FIG. 1. The decoder circuit 200 in FIG. 2 is an illustrative example of a decoder circuit, and the energization control described below can be adapted for use in a wide variety of decoder circuits. The decoder circuit 200 receives encoded user data 202 from a read head 204 that is part of a data storage device such as data storage device 100 illustrated in FIG. 1. The read head 204 reads data from storage media such as disc 106 in FIG. 1. The decoder circuit 200 provides a decoded data output 206 (also called a recover user data output) that is provided to a host system (not illustrated).

The decoder circuit 200 comprises a preamplifier 208 that receives and amplifies the encoded user data 202. The encoded user data 202 typically includes errors. The preamplifier 208 is a low level, low noise amplifier that generates a preamplifier output 210. The decoder circuit 200 comprises a variable gain amplifier (VGA) 212 that receives and amplifies the preamplifier output 210. The variable gain amplifier 212 receives a gain control output 216 that controls a gain of the variable gain amplifier 212. The variable gain amplifier 212 generates a VGA output 214. The decoder circuit 200 comprises a prefilter 218 that receives and filters the VGA output 214. The prefilter generates a prefilter output 220 (also called an equalizing filter input 220). It is understood that signal processes stages 208, 212, 218 that are coupled in cascade between the encoded user data 202 and the equalizing filter input 220 are merely exemplary, and that numerous variations of multistage signal processing can be used to generate the equalizing filter input 220 from encoded user data 202.

The decoder circuit 200 comprises an equalizing filter 999. The equalizing filter 222 preferably comprises a finite impulse response (FIR) filter 224 with multiple taps 226 that are settable to control the frequency response characteristics (bandpass) of the FIR filter 224. The equalizing filter 999 comprises an adaptation circuit 228. The adaptation circuit 228 couples to the taps 226 and adaptively sets the taps 226 to levels that control the frequency response characteristics as a function of bit error rate (BER).

The function of BER can simply include counting a number of sectors read since the last energization of the adaptation circuit 228, and re-energizing the adaptation circuit after a fixed number of reads. The function of BER can alternatively comprise a function of estimated BER data 230 provided by a viterbi decoder 232 that is part of the decoder circuit 200. Alternatively, the adaptation circuit 228 can control the taps 226 as a function of a quality monitor output (QM) 234, which is also a form of bit error rate data. An input 235 of the energization control circuit 238 can alternatively couple to a counter output 237, to the QM output 234 or to the BER data 230.

The equalizing filter 222 functions as a first error reduction stage that includes an adaptation circuit 228 that provides adaptable error reduction as a function of bit error rate. Power consumption in the adaptation circuit 228 is controlled by an output 240 which can turn the adaptation circuit 228 ON or OFF. The adaptation circuit 228 can be turned ON and OFF by connecting and disconnecting power to at least a portion of the adaptation circuit 228 using a solid state switch. The adaptation circuit 228 can also be turned ON and OFF by stopping or reducing a clock to at least portions of the adaptation circuit 228. The terms ON and OFF are relative and refer to a higher and lower level of power consumption, respectively. When the adaptation circuit 228 is off, the taps are frozen in states (1 or 0) based on the last adaptation.

The bit error rate characteristics of the encoded user data 202 varies as a result of mechanical and thermal conditions of the read head 204, and as a result of aging of the read head 204. For example, there is a variation in fly height and data rate of the read head 204 as the read head 204 accesses data from different zones at different radii on the disc surface. Read head response can also change due to head aging. The electromagnetic characteristics of the read head 204 can vary with changes in ambient temperature. It is difficult to predict when the read head response will change and hence the equalizing filter 222 uses real time, closed loop feedback (adaptation) based on either BER estimates or a quality monitor output to adapt frequency response to real time error conditions.

The adaptation circuit 228 consumes power in performing calculations needed to set the taps 226. In a typical adaptation circuit embodiment, the adaptation circuit draws about 20 mW of electrical power from a battery power source 236 when it is ON.

While the FIR filter 224 operates substantially continuously during read operations, it is found that functioning of the adaptation circuits 228, 250 can be stopped or turned OFF under certain conditions for controlled time intervals without compromising the error reduction function of the equalizing filter, and then turned ON again as needed to provide adaptation when needed. An examples of the timing of ON and OFF time intervals is described in more detail below in connection with an example illustrated in FIG. 3.

The decoder circuit 200 comprises a noise predictive maximum likelihood (NPML) detector 252. The NPML detector 252 includes the adaptation circuit 250 that adapts settings or taps of the NPML detector 252 to reduce errors. The adaptation circuit 250 is comparable to the adaptation circuit 228 described above. The adaptation circuit 250 is energized by the battery 236. The adaptation circuit 250 adaptively adjusts detection complexity of the NPML detector to provide adaptive error reduction. The energization of the adaptation circuit 250 is controlled by an energization control output 240 that is input to the adaptation circuit 250.

An energization control circuit 238 generates the energization control output 240 that couples to the adaptation circuits 228, 250. The energization control output 240 controls an energization of the adaptation circuit as a function of actual or assumed channel quality at input 235. The energization control output 240 can control connection and disconnection of power input 236 from calculation circuitry in the adaptation circuit 228. Alternatively, the energization control output 240 can control clock speed of calculation circuitry in the adaptation circuit 228 to control energization levels. When the energization of the adaptation circuit 228 is at an OFF state, the taps 226 are temporarily frozen at substantially fixed levels, and the equalization filter 222 has a substantially fixed frequency response.

The energization control circuit 238 generates the energization control output 240 as a function of a number of sectors read since a last energization, bit error rate or channel quality. A moving average of past BER or channel quality can also be used. The energization control circuit 238 preferably energizes the adaptation circuit 228 when the moving average is less than a first quality level. The energization control circuit 238 preferably de-energizes the adaptation circuit 228 when the moving average is more than a second quality level. The functional relationship in the adaptation circuit 238 between first and second quality levels and ON and OFF energization levels is described in more detail below in connection with examples shown FIGS. 4-5.

Figure 3:
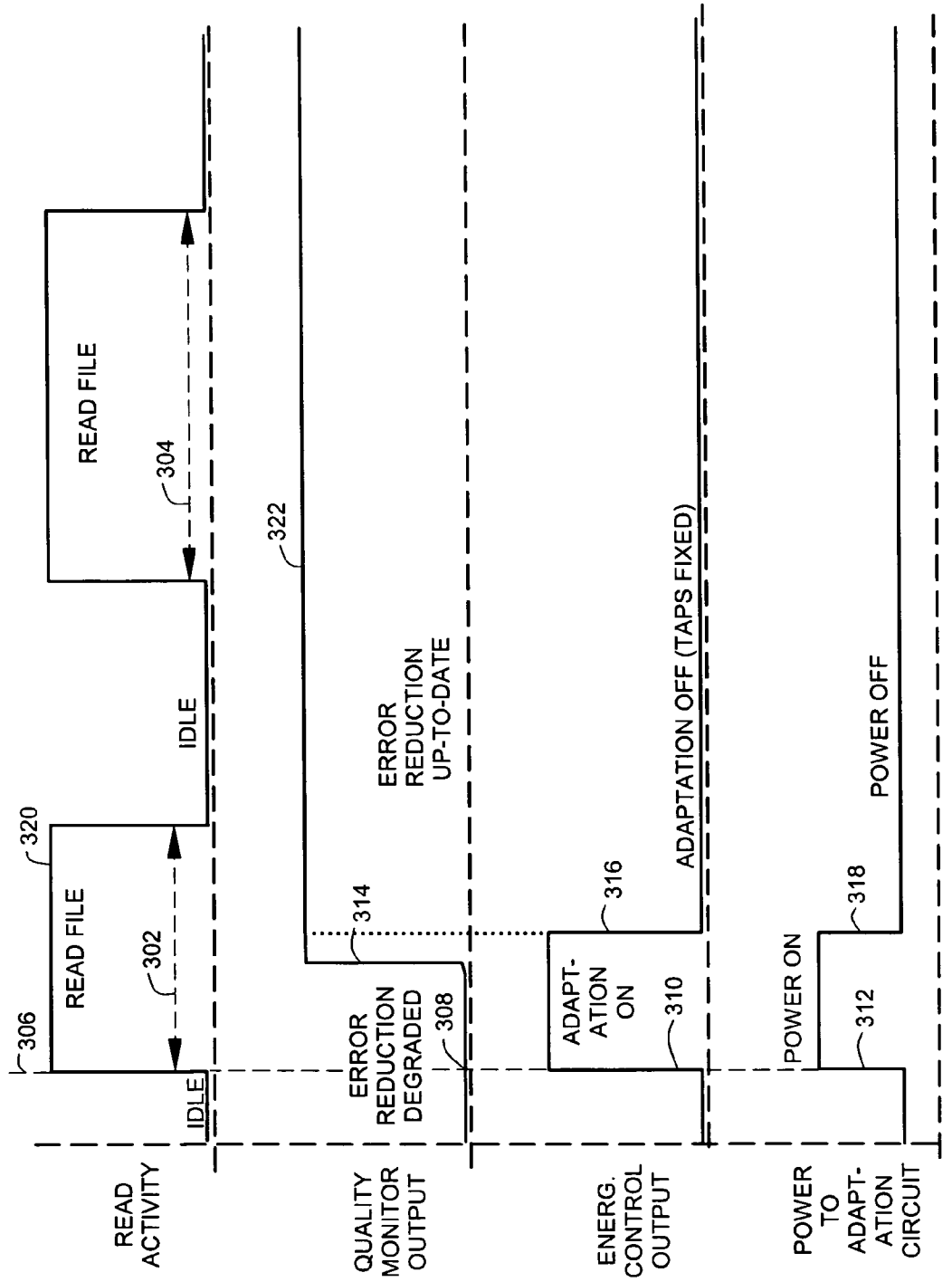
FIG. 3 is a timing diagram of energization control activity in a decoder circuit.

FIG. 3 illustrates an exemplary timing diagram of energization control activity in a decoder circuit such as the decoder circuit 200 in FIG. 2. A host computer system (not illustrated) requests reading of a first file, a second file and additional files (not illustrated). The disc drive responds with read activity and reads the first file during a first time interval 302 and subsequently reads the second file during a second time interval 304. At a start time 306 of reading the first file, the input 235 indicates that error reduction performance is degraded as illustrated at 308. Responsive to an input (such as input 235), an energization control circuit (such as energization control circuit 238 in FIG. 2) turns on an energization control output (such as energization control output 240 in FIG. 2) as indicated at 310. The energization control output couples to an adaptation circuit in an equalization circuit (such as adaptation circuit 228 in equalization circuit 222 of FIG. 2) and the adaptation circuit in the equalization circuit is energized as indicated at 312. The energization control output can also couple to an adaptation circuit in an NPML detector (such as adaptation circuit 250 in NPML detector 252 of FIG. 2) and the adaptation circuit in the NPML detector is also energized as indicated at 312. Prior to 312, the adaptation circuit is de-energized because adaptation is not in use during idle or write intervals.

After the adaptation circuits have been running for some time, the error reduction performance is improved by changing tap settings, and the quality monitor output increases as indicated at 314. The energization control circuit then turns off the energization control output as indicated at 316. The adaptation circuits are powered down or de-energized as indicate at 318. The disc drive continues to read the first file after the adaptation circuits are de-energized as indicated at 320. The energization and de-energization of the adaptation circuit or circuits is selective in that the decoder circuits are energized and operating during a read interval while the adaptation circuits are de-energized.

During the subsequent read of the second file at 304, the quality monitor output remains high as indicate at 322, and the adaptation circuits remain de-energized throughout the reading of the second file. Third and subsequent files can be read without any energization of the adaptation circuits. The adaptation circuits are not re-energized again until quality may be again degraded. A great deal of power is saved because the adaptation circuits are shut off when they are not needed for active adaptation. The equalization filter and NPML detector, however, continue to be energized and are able to effectively function as error reduction stages during long time intervals when the adaptation circuits are de-energized. Life of the battery is extended and customer satisfaction with the product is improved.

FIGS. 4-5 illustrate two illustrative examples of functioning of an energization control circuit such as energization control circuit 238 in FIG. 2 when the input is a QM output such as QM output 234. Horizontal axes 402, 404 represent a quality monitor input QM to energization control circuits. Vertical axes 404, 408 represent ON and OFF states of energization control circuits.

As illustrated in the example in FIG. 4, when the quality monitor output QM (or a moving average of the quality monitor output) is lower, the energization control output is high or ON as indicated at 410. When the quality monitor output (or a moving average of the quality monitor output) increases, the energization control output changes state at threshold level 414 and is at a low or OFF level 412 when the quality monitor output (or a moving average of the quality monitor output) is above the threshold level 414.

As illustrated in the example in FIG. 5, when the quality monitor output QM (or a moving average of the quality monitor output) is lower, the energization control output is high or ON as indicated at 416. When the quality monitor output (or a moving average of the quality monitor output) increases, the energization control output changes state at first threshold level 499 and is at a low or OFF level 418 when the quality monitor output (or a moving average of the quality monitor output) is higher. When the quality monitor output decreases, a change from OFF to ON state takes place at second threshold level 420. In FIG. 5, a certain amount of hysteresis is provided in an hysteretic control range between first threshold level 420 and second threshold level 499 to reduce the possibility of energization jitter on moving back and forth between an energized ON state and a de-energized OFF state.

Figure 6:
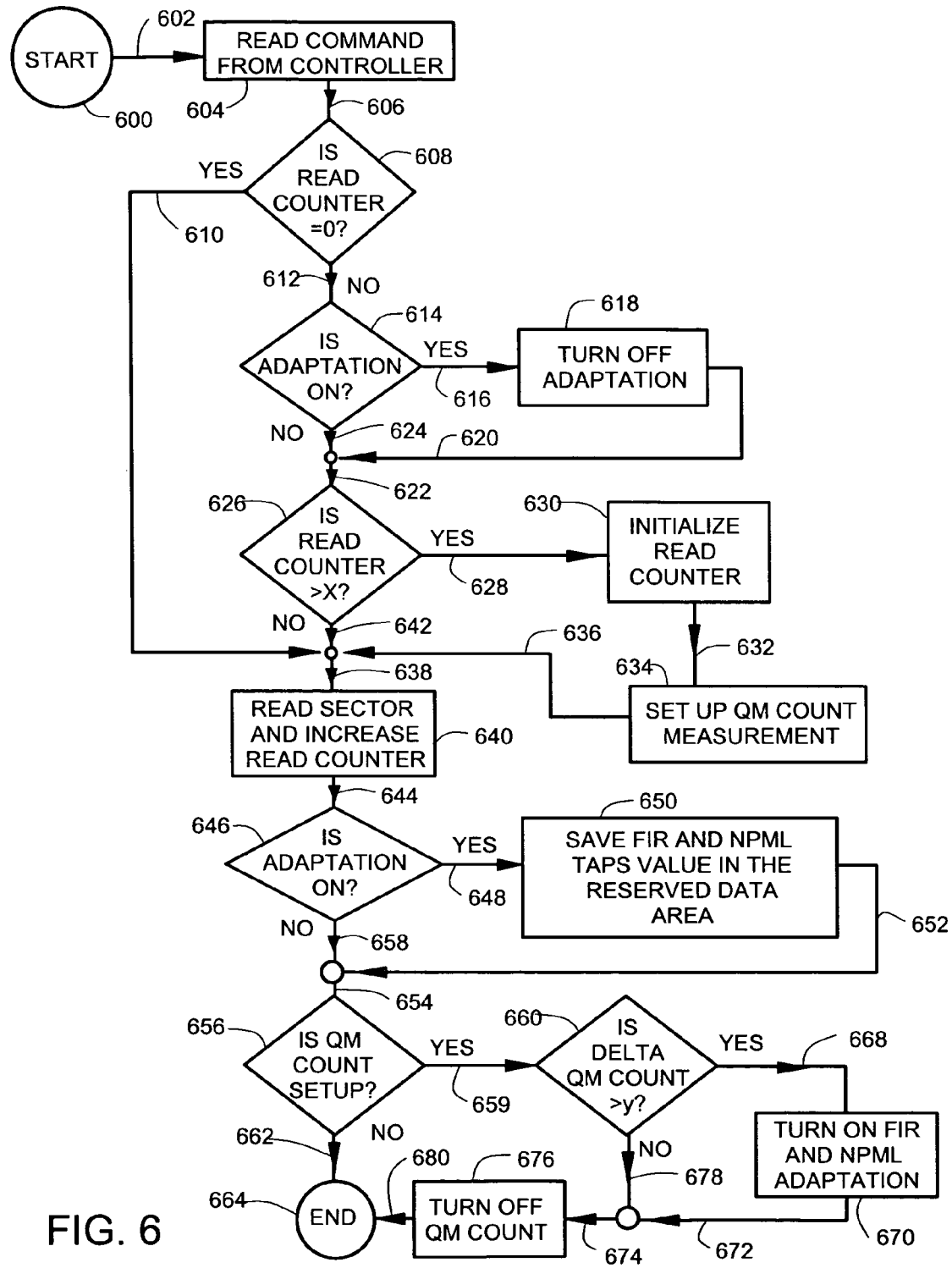
FIG. 6 is a flow chart of an algorithm that can be used in an energization control circuit.

FIG. 6 illustrates a flow chart of an algorithm that can be used in an energization control circuit to provide control of adaptation circuits in an equalizing filter, a NPML detector, or both to reduce power consumption. In FIG. 6, a count of a number sectors read is used as an indication of expected bit error rate.

Algorithm (program) execution begins at start 600 and continues along line 602 to action block 604. At action block 604, execution waits until a command is received from a disc drive controller to read a file. While waiting at action block 604, the disc drive may be idle or may be performing a write operation. After the command is received, program execution continues along line 606 to decision block 608.

At decision block 608, a read counter is tested to see if it is set to zero. If the read counter is set to zero, then program execution continues along line 610. If the read counter is not set to zero, then program execution continues along line 612 to decision block 614. The read counter counts (up or down) the number of sectors that are read since the last adaptation.

At decision block 614, a bit is tested to see if adaptation is ON. If the adaptation is ON, then program execution continues along line 616 to action block 618. At action block 618, adaptation is turned OFF, and then program flow continues along lines 620, 622 to decision block 626. If the adaptation is already set OFF at decision block 614, then program execution continues along lines 624, 622 to decision block 626.

At decision block 626, the read counter is tested to see if it is greater than a preset value X. The preset value X represents a number of sectors to be read between instances of powering ON the adaptation circuits. If the read counter is greater than the preset value X, then execution continues along line 628 to action block 630. At action block 630, the read counter is initialized or set to zero (or another present number), and then program flow continues along line 632 to action block 634. At action block 634, a QM count measurement is set up, then program flow continues along lines 636, 638 to action block 640. If the read counter is not greater than the preset value X at decision block 626, then program flow continues along lines 642, 638 to action block 640.

At action block 640, a sector is read, and the read counter is incremented (or decremented) to count the sector read. After completion of action block 640, program flow continues along line 644 to decision block 646.

At decision block 646, a bit is tested to see if adaptation is turned ON. If adaptation is turned ON, then program flow continues along line 648 to action block 650. At action block 650, FIR filter and NPML taps values are saved in a reserved data area and then program flow continues along lines 652, 654 to decision block 656. If adaptation is not turned ON at decision block 646, then program flow continues along lines 658, 654 to decision block 656.

At decision block 656, a bit is tested to see if a QM count is set up. If the QM count is set up, then execution continues along line 659 to decision block 660. If a QM count is not set up at decision block 656, then execution continues along line 662 to END 664.

At decision block 660, if a delta QM count (a change in the QM count) is greater than a preset count Y, then execution continues along line 668 to action block 670. At action block 670, adaptation circuits in an FIR filter (of an equalizing filter) and a NPML detector are turned on, and then execution continues along lines 672, 674 to action block 676. If a delta QM count is not greater than the present count Y at action block 660, then execution continues along lines 678, 674 to action block 676.

At action block 676, the QM count is turned OFF, and then execution continues along line 680 to end 664. At end 664, execution can continue directly or indirectly back to start 600.

When the drive controller issues a read command (block 604), the read counter will be checked (blocks 608, 626). The following are the three possible scenarios, 1. The read counter is zero (path 610). The QM count has been checked in the previous read operation. Hence it proceed to read the sector (block 640).

2. The read counter is greater than zero (path 612) but the adaptation is turned on (path 616). Since the read counter is not zero, the FIR and NPML has been calibrated in the previous read operation. Hence, the adaptation is turned off (block 618) to save power.

3) The read counter is greater than zero but the adaptation is off (paths 624, 622). Adaptation is off means no calibration is required, hence it proceeds to read the sector (path 642, 638).

If the read counter is expired (block 626), the QM count is checked (blocks 634, 660) to see whether there is any performance degradation. In this case, the counter is initialized (block 630) and the mechanism for QM count measurement is setup (block 634). Then the read operation will be carried out as usual. At the end of the read operation, the QM count will be compared with the base value (block 660). If the delta in the QM count exceeds a certain threshold, the adaptation of FIR and NPML is turned on (block 668) so that they will be calibrated in the next read operation. The calibrated FIR and NPML taps values will be saved (block 650) in the reserved data area of the disk.

The equalizing filter and NPML detector of the read channel have an important role of equalizing the head response to the channel target. Matching the head response to the target is important to error reduction but does not guarantee a good bit error rate (BER). The read head response changes because there is a variation in fly height and data rate when the head fetches data from different zones at different radial locations. Head response can also change due to head aging or due to a change in ambient temperature. It is difficult to anticipate when the head response has changed and hence the equalizing filter and NPML detector were previously set to be fully adapting as long as the reader is turned on. The adaptation of equalizing filter and the NPML detector typically consumes 20 mW of power. In term of ampere-hours, this consumption causes a significant reduction in battery operating life between charges of a rechargeable battery and between replacements of a non-recharged battery.

Portable drives are used mainly for storing multimedia files, which are usually not fragmented into multiple data zones. These multimedia files are likely to be retrieved by a sequential read from a single data zone. Adaptation of a FIR filter and a NPML detector can be turned off during read-back without having significant impact on the drive performance.

In the embodiments describe above, the system performance is monitored at a regular basis. The FIR and NPML taps or settings are re-calibrated when the performance degraded to a predetermined threshold.

The QM count is selected as a measure of the system performance for several reasons:

1. QM count correlates very well with the raw BER.
2. Measuring QM count is faster than measuring BER.
3. Measuring QM count doesn't require special data pattern.
4. Measuring QM count and reading user data can be performed concurrently.

First, the QM counts of the individual zones is obtained during a certification process (in the factory) and these values are stored in the reserved data-area in the disc drive. These QM counts are also called base values. Read counters created for each data zone measure the number of read operation since the last FIR and NPML calibration.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the energization control system while maintaining substantially the same functionality without departing from the scope and spirit of the present invention. In addition, although the preferred embodiment described herein is directed to a disc drive system for storing data, it will be appreciated by those skilled in the art that the teachings of the present invention can be applied to other decoder circuits in other communication channels, without departing from the scope and spirit of the present invention.

What is claimed is:

1. A multistage decoder circuit, comprising:
   a first error reduction stage that includes an adaptation circuit that controls multiple filter taps that provide adaptable error reduction as a function of bit error rate; and
   an energization control circuit that couples to the adaptation circuit, the multiple filter taps freezing based on a last adaptation when the energization control circuit shuts off energization of the adaptation circuit.

2. The multistage decoder circuit of claim 1 wherein the function of bit error rate comprises a count of a number of sectors read since a previous energization of the adaptation circuit.

3. The multistage decoder of claim 1 wherein the function of bit error rate comprises a moving average of past bit error rate.

4. The multistage decoder of claim 3 wherein the energization control circuit energizes the adaptation circuit when the moving average is less than a first bit error rate level.

5. The multistage decoder of claim 4 wherein the energization control circuit de-energizes the adaptation circuit when the moving average is more than a second bit error rate level.

6. The multistage decoder of claim 5 wherein the energization control circuit comprises a hysteretic control range between the first and second moving average threshold levels.

7. The multistage decoder of claim 1 wherein the energization control circuit sets the energization ON during an ON time interval at the start of reading a first file, and the control circuit sets the energization OFF during an OFF time interval after the ON time interval, reducing power consumption for adaptation after the start of reading the first file.

8. The multistage decoder of claim 7 wherein the energization remains set OFF during a reading of a second file after the first file.

9. The multistage decoder of claim 1 further comprising a battery providing energization to the energization control circuit.

10. The multistage decoder circuit of claim 1 wherein the first error reduction stage comprises an equalizing filter that has the multiple filter taps, and the adaptable error reduction comprises an adaptable frequency response of the equalizing filter.

11. The multistage decoder circuit of claim 10, further comprising a second error reduction stage that includes a detector wherein the adaptable error reduction comprises an adaptable detection complexity of the detector.

12. The multistage decoder circuit of claim 1 wherein the multistage decoder circuit comprises a read channel for a data storage device.

13. A method, comprising:

providing a read counter with a read counter count and a read counter preset number;

incrementing the read counter count when a sector is read; and shutting off adaptation energization provided to an adaptive error reduction stage that controls multiple filter taps as a function of a difference between the read counter count and the read counter preset number, the multiple filter taps freezing based on a last adaptation when the adaptation energy is shut off.

14. The method of claim 13 further comprising:

providing a quality monitor counter with a quality monitor count and a quality monitor change preset number;

comparing the quality monitor count to the quality monitor change preset; and providing the adaptation energization to the adaptive error reduction stage if a change in the quality monitor count exceeds the quality monitor change present number.

15. The method of claim 13 further comprising:

saving noise predictive maximum likelihood detector tap settings if the adaptation energization is shut off.

16. A multistage decoder circuit, comprising:

a first error reduction stage that controls multiple filter taps and that includes an adaptation circuit that provides adaptable error reduction as a function of bit error rate; and an energization control circuit that couples an energization control output to the adaptation circuit that controls an energization of the adaptation circuit, the multiple filter taps freezing based on a last adaptation when the energization control circuit shuts off energization of the adaptation circuit.

17. The multistage decoder circuit of claim 16 wherein the function of bit error rate comprises a count of a number of sectors read since a previous energization of the adaptation circuit.

18. The multistage decoder circuit of claim 16 wherein the function of bit error rate comprises a count of a quality monitor output.

* * * * *